United States Patent Office 3,399,197
Patented Aug. 27, 1968

3,399,197
(1,3-DIAZACYCLOALKENE-2-YL)ALKYL-
GUANIDINES
Edward M. Roberts, Cincinnati, Ohio, assignor to
Richardson-Merrell Inc., New York, N.Y., a corporation of Delaware
No Drawing. Filed Apr. 5, 1966, Ser. No. 540,215
15 Claims. (Cl. 260—256.4)

ABSTRACT OF THE DISCLOSURE

The disclosure is of (1,3-diazacycloalkene-2-yl) alkylguanidines useful as anti-hypertensive agents. Alternate routes preparation are taught.

---

This invention relates to novel compounds and processes for their preparation. More particularly, this invention relates to nitrogen heterocycles having guanidinoalkyl substituents and their acid addition salts.

The novel compounds of this invention can be represented by the formula

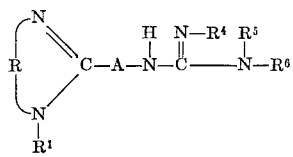

Formula I wherein: R is alkylene having from 2 to 6 carbon atoms and separates its adjacent nitrogen atoms by 2 to 4 ring carbon atoms; A is alkylene having 2 to 6 carbon atoms and separates its adjacent nitrogen atom from the heterocyclic ring by at least 2 carbon atoms; each of $R^1$, $R^4$, $R^5$ and $R^6$ is hydrogen or (lower) alkyl; and acid addition salts thereof.

Illustrative of the heterocyclic group as represented by

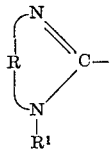

in the above generic formula, there can be mentioned: 2-imidazolin-2-yl; 3,4,5,6-tetrahydropyrimidin-2-yl; 4,5,6,7-tetrahydro-3H-1,3-diazepin-2-yl; 1-methyl-2-imidazolin-2-yl; 1-methyl-3,4,5,6-tetrahydropyrimidin-2-yl; 1-methyl-4,5,6,7 - tetrahydro - 3H-diazepin-2-yl; 1-ethyl-2-imidazolin-2-yl; and the like. The 2-imidazolin-2-yl and 3,4,5,6-tetrahydropyrimidin-2-yl are preferred groups.

The term (lower) alkyl as used herein refers to alkyl groups having from 1 to 6 carbon atoms, and preferably those having the lower number of carbon atoms such as 1 to 2 or 1 to 4 carbon atoms. The (lower) alkyl groups can be straight or branched chain. Illustrative of (lower) alkyls there can be mentioned: methyl; ethyl; n-propyl; isopropyl; n-butyl; tertiary butyl; and the like. The alkylene group as represented by A in the above generic Formula I is preferably straight chain alkylene as can be represented by the group —$(CH_2)_n$— wherein n is an integer from 2 to 6 and preferably 4 to 6. Illustratively, A can be 1,2-ethylene; 1,3-propylene; 1,4-butylene; 1,5-pentylene and 1,6-hexylene. The alkylene group as represented by R in the above generic Formula I is also preferably straight chain alkylene as can be represented by the group —$(CH_2)_m$— wherein m is an integer from 2 to 6, and preferably 2 or 3. The groups as represented by A and R in the generic Formula I can also be branched chain groups with substituents, such as methyl or ethyl.

Illustrative of novel (1,3-diazacycloalkene-2-yl)alkylguanidines of this invention there can be mentioned:
4-(2-imidazolin-2-yl)butylguanidine;
4-(3,4,5,6-tetrahydropyrimidin-2-yl)butylguanidine;
4-(4,5,6,7-tetrahydro-3H-1,3-diazepin-2-yl)butylguanidine;
5-(2-imidazolin-2-yl)pentylguanidine;
5-(3,4,5,6-tetrahydropyrimidin-2-yl)pentylguanidine;
5-(4,5,6,7-tetrahydro-3H-1,3-diazepin-2-yl)pentylguanidine;
6-(2-imidazolin-2-yl)hexylguanidine;
6(3,4,5,6-tetrahydropyrimidin-2-yl)hexylguanidine;
6-(4,5,6,7-tetrahydro-3H-1,3-diazepin-2-yl)hexylguanidine;
4-(1-methyl-2-imidazolin-2-yl)butylguanidine;
5-(1-methyl-2-imidazolin-2-yl)pentylguanidine;
6-(1-methyl-2-imidazolin-2-yl)hexylguanidine;
5-(1-methyl-3,4,5,6-tetrahydropyrimidin-2-yl)pentylguanidine;
5-(1-methyl-4,5,6,7-tetrahydro-3H-1,3-diazepin-2-yl)pentylguanidine;
5-(1-ethyl-2-imidazolin-2-yl)pentylguanidine;
1-[4-(2-imidazolin-2-yl)butyl]-3-methylguanidine;
1-[5-(2-imidazolin-2-yl-)pentyl]-3-methylguanidine;
1-[5-(2-imidazolin-2-yl)pentyl]-2,3-diisopropylguanidine;
1-[6-(2-imidazolin-2-yl)hexyl]-3-methylguanidine;
1-[4-(2-imidazolin-2-yl)butyl]-2,3-dimethylguanidine;
1-[4-(2-imidazolin-2-yl)butyl]-2,3-diethylguanidine;
1-[5-(2-imidazolin-2-yl)pentyl]-2,3-dimethylguanidine;
1-[5-(2-imidazolin-2-yl)pentyl]-2,3-diethylguanidine;
1-[5-(3,4,5,6-tetrahydropyrimidin-2-yl)pentyl]-2,3-dimethylguanidine;
1-[6-(2-imidazolin-2-yl)hexyl]-2,3-diethylguanidine;
1-[6-(3,4,5,6-tetrahydropyrimidin-2-yl)hexyl]-2,3-dimethylguanidine;
1-[6-(2-imidazolin-2-yl)hexyl]-2,3-dimethylguanidine;
1-[4-(2-imidazolin-2-yl)butyl]-3,3-dimethylguanidine;
1-[5-(4,5,6,7-tetrahydro-3H-1,3-diazepin-2-yl)pentyl]-3,3-diethylguanidine;
1-[5-(3,4,5,6-tetrahydropyrimidin-2-yl)pentyl]-3,3-dimethylguanidine;
1-[5-(2-imidazolin-2-yl)pentyl]-3-butylguanidine; and the like.

Salts of the novel compounds of this invention are primarily pharmacologically acceptable, non-toxic acid addition salts with inorganic or organic acids. Suitable inorganic acids are, for example, mineral acids, such as hydrohalic acids, e.g., hydrochloric or hydrobromic acid, or sulfuric or phosphoric acids. Organic acids are, for example, lower aliphatic hydrocarbon monocarboxylic acids, e.g., formic, acetic, propionic or pivalic acid and the like, lower aliphatic hydroxy-hydrocarbon monocarboxylic acids, e.g., glycolic or lactic acid and the like, lower aliphatic lower alkoxy-hydrocarbon monocarboxylic acids, e.g., methoxy-acetic or ethoxy-acetic acids and the like, lower aliphatic lower alkanoyl-hydrocarbon monocarboxylic acids, e.g., pyruvic acid and the like, lower aliphatic halogeno-hydrocarbon monocarboxylic acids, e.g., chloroacetic, dichloroacetic, trichloroacetic acid or bromoacetic acid and the like, lower aliphatic hydrocarbon dicarboxylic acids, e.g., oxalic, malonic, succinic, methylsuccinic, dimethyl - succinic, glutaric, α-methylglutaric, α,α-dimethylglutaric, β-methylglutaric, itaconic, homoitaconic, maleic, citraconic, homocitraconic, pyrocinchonic, xeronic or fumaric acid and the like, lower aliphatic hydroxy-hydrocarbon dicarboxylic acids, e.g., malic or tartaric acid and the like, lower aliphatic lower alkoxy-hydrocarbon dicarboxylic acids, e.g., α,β-dimethoxy-succinic or ethoxymaleic acid and the like, lower aliphatic halogeno-hydrocarbon dicarboxylic acids, e.g., chlorosuccinic or bromosuccinic acid and the like, lower aliphatic hydrocarbon-tricarboxylic acids, e.g., aconitic or tricarballylic acid and the like, lower aliphatic hydroxy-hydrocarbon tricarboxylic acids, e.g., citric acid and the like, monocyclic or bicyclic carbocyclic aryl-carboxylic or carbocyclic aryl-lower aliphatic carboxylic acids, e.g., benzoic, cinnamic, mandelic, salicylic, 4-aminosalicylic, 2-phenoxy-benzoic or 2-acetoxybenzoic acid and the like, or monocyclic or bicyclic carbocyclic aryl-dicarboxylic acids, e.g., phthalic acid and the like. Furthermore, amino acids, e.g., methionine, tryptophane, lysine, arginine, aspartic, glutamic or hydroxy-glutamic acid and the like, or organic sulfonic acids, such as lower alkane sulfonic acids, e.g., methane sulfonic or ethane sulfonic acid and the like, or lower hydroxy-alkane sulfonic acids, e.g., 2-hydroxy-ethane sulfonic acid and the like, may be suitable. Particularly useful are pharmacologically acceptable, non-toxic acid addition salts with mineral acids. Salts with organic acids are primarily those with lower aliphatic hydrocarbon dicarboxylic acids and lower aliphatic hydroxy-hydrocarbon dicarboxylic acids, especially lower alkene dicarboxylic acids, e.g., maleic or citraconic acid and the like, lower hydroxy-alkane dicarboxylic acids, e.g., malic or tartaric acid and the like, or lower hydroxy-alkane tricarboxylic acid, e.g., citric acid and the like. Mono- or di-acid salts may be formed; also, the salts can be hydrated, e.g., monohydrate, or substantially anhydrous.

The novel compounds of this invention and their acid addition salts have vasodepressor activity in animals and can be used as anti-hypertensive agents to relieve hypertensive conditions, such as, for example, neurogenic or renal hypertension. A particular advantage for the administration of the novel compounds and salts of this invention is the decrease or absence of incapacitating side effects associated with hypotonia of the sympathetic nervous system. The hypotensive effect of the novel compounds and their salts does not appear to be mediated entirely and in some cases not at all through ganglionic or adrenergic block or through a centrally mediated decrease in vascular tone. Illustratively, the cardiovascular effects of 5 - (2 - imidazolin - 2 - yl)pentylguanidine sulfate were evaluated in the normo-tensive dog anesthetized with pentobarbital sodium and in the spinal ($C_2$) dog. Blood pressure was recorded from a femoral artery with a mercury manometer. Intravenous injections of 5-(2-imidazolin-2-yl)pentylguanidine sulfate, which ranged in doses of 0.1 to 10 milligrams per kilogram of animal weight were made into the contralateral femoral vein. In order to evaluate the possibility that the drug might lower blood pressure through ganglionic or adrenergic blockade, its effects were also evaluated in normal anesthetized dogs after treatment with phenoxybenzamine or hexamethonium chloride. The drug, 5-(2-imidazolin-2-yl)pentylguanidine sulfate, caused a dose dependent fall in arterial blood pressure in the above experiments. This effect was not altered by prior administration of phenoxybenzamine. The activity of the drug was somewhat reduced in dogs made tachyphylactic to the ganglionic blocking agent hexamethonium. The activity of the 5-(2-imidazolin-2-yl)pentylguanidine sulfate was enhanced in the spinal dog as the result of elimination of compensatory cardiovascular reflexes.

The novel compounds of this invention may be used as medicaments in the form of pharmaceutical preparations, which contain the novel compounds or the acid addition salts thereof in admixture with a pharmaceutical organic or inorganic, solid or liquid carrier suitable for enteral, e.g., oral, or parenteral administration. For making up the preparations there can be employed substances which do not react with the new compounds, such as water, gelatine, lactose, starches, stearyl alcohol, stearic acid, magnesium stearate, talc, vegetable oils, benzyl alcohols, gums, propylene glycol, polyalkylene glycols, petroleum jelly or any other known carrier for medicaments. The pharmaceutical preparations may be in solid form, for example, as tablets, dragees or capsules, or in liquid form, for example as solutions, suspensions or emulsions. If desired, they may contain auxiliary substances, such as preserving agents, stabilizing agents, wetting agents or emulsifying agents, salts for varying the osmotic pressure or buffers and the like. They may also contain, in combination, other therapeutically useful substances, such as tranquilizers or other CNS depressants, diuretics, other blood pressure lowering agents, etc.

The novel compounds of this invention can be prepared by reacting a (1,3-diazacycloalkene-2-yl)alkylamine or acid addition salt thereof with a reagent capable of converting the terminal amino group in the starting material to a guanidino group and, if desired, converting a resulting salt into the free compound, and/or, if desired, converting a free compound into a salt thereof.

The (1,3-diazacycloalkene-2-yl)alkylamines used as starting materials or intermediates for the novel compounds of this invention can be represented by the formula

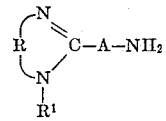

wherein: R is alkylene having from 2 to 6 carbon atoms and separates its adjacent nitrogen atoms by 2 to 4 ring carbon atoms; A is alkylene having 2 to 6 carbon atoms and separates its adjacent nitrogen atom from the heterocyclic ring by at least 2 carbon atoms; and $R^1$ is hydrogen or (lower) alkyl; and acid addition salts thereof.

Some of the intermediates are known, whereas others can be prepared by known methods. Among the known intermediates is 2-(2-imidazolin-2-yl)ethylamine which is described by J. Jilek and M. Protiva, Collection Czech. Chem. Communs. 15, 659–70 (1950). Briefly, by a novel method, the (1,3-diazacycloalkene-2-yl)alkylamine intermediates can be obtained by mixing at about room temperature about equal molar quantities of an O-(lower) alkyl lactim having from 4 to 7 carbon atoms in the heterocyclic ring with a diaminoalkylene or a mineral acid salt of a diaminoalkylene, preferably in an inert solvent, e.g., ethanol. The reaction can be illustrated by the equation:

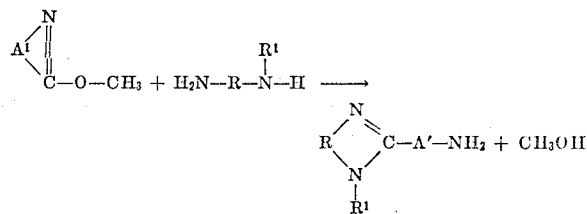

wherein A' is alkylene of 3 to 6 carbon atoms having at least 3 ring carbon atoms; and each of R and $R^1$ have the same meaning as in generic Formula I.

The preferred reagents capable of converting the amino group of the intermediates into a guanidino group are S-lower alkyl-isothioureas or O-lower alkyl-isoureas, or, preferably, their acid addition salts, particularly their salts with mineral acids, such as hydrohalic acids, e.g., hydrochloric or hydrobromic acid, or primarily with sulfuric acid. Lower alkyl represents, for example, methyl, ethyl, n-propyl, isopropyl and the like. These reagents may, therefore, have the formula:

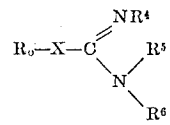

in which $R^4$, $R^5$ and $R^6$ have the previously given meaning, X stands for sulfur or oxygen and $R_0$ represents lower alkyl, and acid addition salts thereof. The preferred reagents are sulfates of S-lower alkyl-isothioureas; S-methyl-isothiourea sulfate is especially useful to form compounds which contain an unsubstituted guanidino group.

The (1,3-diazacycloalkene-2-yl)alkylamine intermediate or an acid addition salt of the intermediate is contacted with the guanylating reagent either in the presence or absence of a solvent. Water or preferably water-miscible organic solvents, such as lower alkanols, e.g., methanol, ethanol, propanol, isopropanol, tertiary butanol and the like, cyclic ethers, e.g., tetrahydrofuran, p-dioxane and the like, ketones, e.g., acetone, ethyl methyl ketone and the like, lower alkanoic acids, e.g., acetic acid and the like, may be used as diluents. The reaction may be carried out at room temperature, or, if necessary, at an elevated temperature, for example, at the boiling temperature of the solvent, or at the fusion point of the reaction mixture if no solvent is used. If desired, the reaction can be run in an atmosphere of an inert gas, e.g., nitrogen. The total number of equivalents of acid present in the reaction solution, whether added as part of a salt of a reactant or added as free acid, may advantageously equal the number of moles of starting amine intermediate plus the number of moles of guanylating agent.

The S-lower alkyl-isothiourea and O-lower alkylisoureas used in the above reaction are known, and may be prepared, for example, by alkylating thioureas or ureas, in which at least one of the nitrogen atoms carries a hydrogen atom, with a lower alkyl halide, e.g., methyl or ethyl chloride, bromide or iodide and the like, or with a bis-lower alkyl-sulfate, e.g., dimethyl sulfate or diethyl sulfate and the like.

Other reagents capable of transforming the amino group of a (1,3-diazacycloalkene-2-yl)alkylamine intermediate, particularly of an acid addition salt thereof, are cyanamides having the formula:

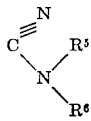

The reaction may be carried out, for example, by heating a mixture of the (1,3-diazacycloalkene-2-yl)alkylamine intermediate, especially in the form of a salt thereof, particularly a mineral acid addition salt, such as the hydrochloride, hydrobromide, or sulfate and the like, and the cyanamide. The resulting melt may then be dissolved in a solvent, such as a lower alkanoic acid, e.g., acetic acid, and the like and the desired product may be isolated, for example, by crystallization and the like. The reaction may be carried out in the absence or in the presence of a solvent; the salt of a free base used as the starting material may also be formed at the site of reaction by performing the latter in the presence of an acid, particularly a concentrated aqueous mineral acid, e.g., hydrochloric acid and the like. The reaction may proceed exothermically, and is maintained by heating, for example, to from about 80° to about 150°; an atmosphere of an inert gas, e.g., nitrogen may be advantageous.

A third modification of the procedure for the manfacture of the novel compounds of this invention or their salts comprises reacting the intermediate with a salt of a 1-guanyl-pyrazole, preferably a 3,5-dimethyl-1-guanyl-pyrazole. A salt of a 1-guanyl-pyrazole is primarily a salt with a mineral acid, such as, for example, nitric acid. The reaction may be carried out in the absence of a solvent, for example by fusing the two reactants, or in the presence of a diluent, such as, for example, a lower alkanol, e.g., ethanol and the like. The reaction mixture is preferably heated, for example, to the melting point of the mixture or to the boiling point of the solvent.

A fourth modification of the procedure for the manufacture of the novel guanidines of this invention or their salts comprises treating the intermediate amine with a carbodiimide or a salt of a carbodiimide of the following structure:

$$R^4—N=C=N—R^5$$

where $R^4$ and $R^5$ have the meaning previously ascribed to them. The reaction may be carried out as with the cyanamides above in the presence of a solvent, e.g., benzene, or in the absence of a solvent. The method may be used to obtain the product guanidines either as acid salts or free bases.

The novel compounds of this invention may be obtained in the form of the free compounds or as the salts thereof. A salt may be converted into the free compound in the customary way, for example, by treatment with a strong alkaline reagent, such as aqueous alkali metal hydroxide, e.g., lithium, sodium or potassium hydroxide, or a strong quaternary ammonium anion (hydroxy ion) exchange resin and the like. The treatment with alkali is best conducted with cooling to avoid production of small amounts of urea by hydrolysis of the guanidine. A free base may be transformed into its therapeutically useful acid addition salts by reacting the latter with an appropriate inorganic or organic acid, such as one of those outlined hereinabove; such reaction may be carried out advantageously in a solvent, such as, for example, water, a lower alkanol, e.g., methanol, ethanol, propanol, isopropanol and the like, an ether, e.g., diethyl ether, p-dioxane and the like, a lower alkyl lower alkanoate, e.g., ethyl acetate and the like, a lower alkyl ketone, e.g., acetone, butanone and the like, a mixture of such solvents, and isolating the desired salt.

The following examples are illustrative of the invention.

Example 1.—Preparation of 5-(2-imidazolin-2-yl) pentylguanidine sulfate

To a solution of 5.86 g. of 5-(2-imidazolin-2-yl) pentylamine in 25 ml. of water plus 1.05 ml. of concentrated sulfuric acid was added 5.27 g. of S-methyl pseudothiourea sulfate (also referred to herein as S-methylisothiourea sulfate). The reaction mixture was heated on the steam bath for 5 hours before the water was evaporated under vacuum to give a colorless oil, which crystallized under ethanol, or, more readily, from a 50% aqueous solution. Such treatment gave 9.39 g. of hard, crystalline 5 - (2-imidazolin-2-yl)pentylguanidine sulfate as a hydrated salt. Recrystallization of this material from water gave a hard, crystalline, polyhydrated salt, containing about 4 moles of water for each mole of salt. The polyhydrated salt on air-drying gave 5 - (2-imidazolin - 2 - yl)pentylguanidine sulfate monohydrate, M.P. 294–296° C. The monohydrate could readily be dried under vacuum at 110° C. to give the anhydrous salt, melting point unchanged. The free base form of this compound can be prepared by conventional techniques and can be represented by the formula:

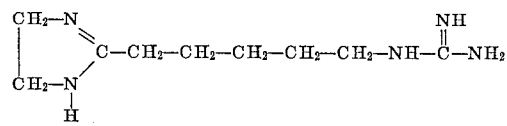

Example 2.—Preparation of 5-(2-imidazolin-2-yl) pentylguanidine dinitrate

To 5.33 g. (0.034 mole) of 5-(2-imidazolin-2-yl) pentylamine in 15 ml. of water was added 17 ml. (0.034 mole) of 10% nitric acid and 7.26 g. (0.036 mole) of 3,5-dimethyl-1-guanylpyrazole nitrate with 20 ml. of water. The latter reagent, M.P. 167–169.5° C., was prepared by the method of Thiele and Dralle, Ann., 302, 275 (1898). The reaction mixture was refluxed overnight, cooled to room temperature, and extracted several times with 25-ml. portions of ether to remove 3,5-dimethylpyrazole. The water was evaporated under vacuum to give a white semi-solid which was triturated with ethanol and crystallized from 95% ethanol. This treatment gave 5.60 g. of 5 - (2 - imidazolin - 2 - yl)pentylguanidine dinitrate. The salt occurs in either of two polymorphic forms, M.P. 132–133° C. and M.P. 140–141° C. Vigorous grinding of the low-melting polymorph converts it to the high-melting one.

Example 3.—Preparation of 5 - (3,4,5,6 - tetrahydropyrimidin - 2 - yl)pentylguanidine dihydrochloride monohydrate A solution of 21.20 g. of 5 - (3,4,5,6 - tetrahydropyrimidin - 2 - yl)pentylamine, 24.20 g. of 3,5-dimethyl-1-guanylpyrazole hydrochloride (M.P. 137–138° C.) and 10.35 ml. of 37.3% hydrochloric acid in 200 ml. of ethanol was heated at reflux for two hours, and then, after cooling to room temperature, was poured into 2 liters of absolute ether. The precipitated oil was heated on the steam bath under reduced pressure to allow the by-product, 3,5-dimethylpyrazole to sublime from the mixture. The residual oil was dissolved in 150 ml. of hot isopropanol with the addition of 3 ml. of water. Cooling gave 15.51 g. of crude, crystalline, hydrated salt. Recrystallization from 65 ml. of hot isopropanol gave 9.00 g. of 5 - (3,4,5,6 - tetrahydropyrimidin - 2 - yl)pentylguanidine dihydrochloride monohydrate, M.P. 84–87° C. The free base form of this compound can be represented by the formula

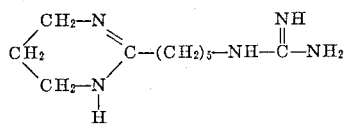

Example 4.—Preparation of 5-(4,5,6,7-tetrahydro-3H-1,3-diazepin-2-yl)pentylguanidine sulfate According to the method of Example 1, an equivalent molar quantity of 5 - (4,5,6,7 - tetrahydro - 3H - 1,3-diazepin - 2 - yl) pentylamine was substituted for the 5 - (2 - imidazolin - 2 - yl)pentylamine and reacted with the S-methylpseudothiourea sulfate to prepare 5-(4,5,6,7 - tetrahydro - 3H - 1,3 - diazepin - 2 - yl)pentylguanidine sulfate, M.P. 267–287° C. with decomposition. The free base form of this salt can be represented by the formula

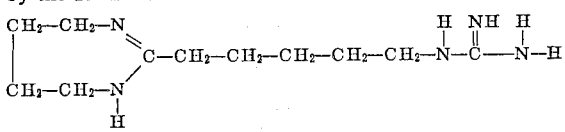

Example 5.—Preparation of 4-(2-imidazolin-2-yl)butylguanidine sulfate

According to the method of Example 1, an equivalent molar quantity of 4 - (2 - imidazolin - 2 - yl)butylamine was substituted for the 5 - (2 - imidazolin - 2 - yl)pentylamine and reacted with the S-methylpseudothiourea sulfate to give 4 - (2 - imidazolin - 2 - yl)butylguanidine sulfate, melting with decomposition 280–285° C. The free base form of this salt can be represented by the formula

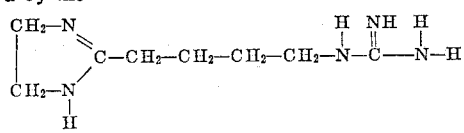

Example 6.—Preparation of 4-(3,4,5,6-tetrahydropyrimidin-2-yl)butylguanidine sulfate monohydrate According to the method of Example 1, an equivalent molar quantity of 4 - (3,4,5,6 - tetrahydropyrimidin - 2-yl)butylguanidine was substituted for the 5 - (2-imidazolin - 2 - yl) pentylamine and reacted with the S-methylpseudothiourea sulfate to prepare 4 - (3,4,5,6 - tetrahydropyrimidin - 2 - yl)butylguanidine sulfate monohydrate.

Example 7.—Preparation of 6-(3,4,5,6-tetrahydropyrimidin-2-yl)hexylguanidine sulfate According to the method of Example 1, an equivalent molar quantity of 6 - (3,4,5,6 - tetrahydropyrimidin-2-yl)hexylamine was substituted for the 5 - (2 - imidazolin - 2 - yl)pentylamine and reacted with the S-methylpseudothiourea sulfate to prepare 6 - (3,4,5,6 - tetrahydropyrimidin - 2 - yl)hexylguanidine sulfate, M.P. 258–265° C. which can be, by conventional techniques, converted to the free base form and represented by the formula

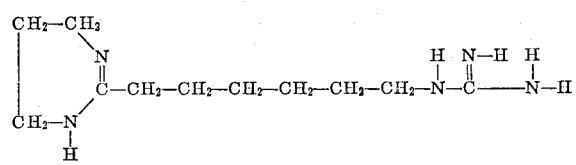

Example 8.—Preparation of 1-[5-(2-imidazolin-2-yl)pentyl]-2,3-dimethylguanidine dihydroiodide To a solution of 39.6 g. of 5-(2-imidazolin-2-yl)penylamine in 140 ml. of water plus 69.8 g. of 47% hydriodic acid was added 66.0 g. of 1,2,3-trimethylpseudothiourea hydroiodide. The solution was flushed with a slow nitrogen stream while standing overnight at room temperature. The solution was then heated on a steam bath for one hour before the water was removed under vacuum on a steam bath to give the product as a heavy yellow oil. The crude oil was dissolved in boiling isopropanol (3 ml./g.) and cooled to give crystals. Two additional recrystallizations from isopropanol gave 6.02 g. of 1-[5-(2-imidazolin-2-yl)pentyl]-2,3-dimethylguanidine dihydroiodide, M.P. 172–176° C. In the free base form, this compound can be represented by the formula

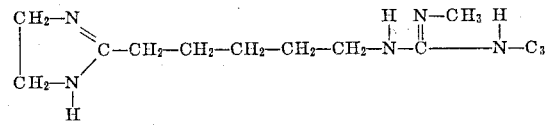

Example 9.—Preparation of 1-[5-(2-imidazolin-2-yl)pentyl]-3-methylguanidine dihydroiodide According to the method of Example 8, with 1,2-dimethylpseudothiourea hydroiodide being used in place of the guanylating agent of that example, 5-(2-imidazolin-2-yl)pentylamine was converted to 1-[5-(2-imidazolin-2-yl)pentyl]-3-methylguanidine dihydroiodide, M.P. 134–137° C. after five recrystallizations from isopropanol.

Example 10.—Preparation of 1-[5-(2-imidazolin-2-yl)pentyl]-3,3-dimethylguanidine dihydroiodide According to the method of Example 8, with 1,1,2-trimethylpseudothiourea hydroiodide being used in place of the guanylating agent of that example, 5-(2-imidazolin-2-yl)pentylamine can be converted to 1-[5-(2-imidazolin-2-yl)pentyl]-3,3-dimethylguanidine dihydroiodide.

Example 11.—Preparation of 1-[5-(2-imidazolin-2-yl)pentyl]-2,3,3-trimethylguanidine dihydroiodide According to the method of Example 8, with 1,1,2,3-tetramethylpseudothiourea hydroiodide substituted in place of the 1,2,3-trimethylpseudothiourea hydroiodide, there can be prepared 1-[5-(2-imidazolin-2-yl)pentyl]-2,3,3-trimethylguanidine dihydroiodide.

Example 12.—Preparation of 1-[5-(1-methyl-2-imidazolin-2-yl)pentyl]-2,3-dimethylguanidine dihydroiodide A mixture of 8.45 g. (0.05 mole) of 5-(1-methyl-2-imidazolin-2-yl)pentylamine and 12.30 g. (0.05 mole) of 1,2,3-trimethylpseudothiourea hydroiodide was heated on the steam bath for 1.5 hours. The reactants fused into a single phase as soon as heating was begun. Methylmercaptan gas evolution was quite vigorous. At the end of the reaction time, the glass that resulted from cooling the melt was stirred and washed well with isopropylacetate. The isopropylacetate was decanted, and the insoluble residue was dissolved in the minimum amount of isopropanol at room temperature. The isopropanol solution was treated with 13.65 g. (0.05 mole) of hydriodic acid (47% aqueous solution). The desired dihydroiodide (11.30 g.), M.P. 183–184.5° C., crystallized at room temperature. Dissolution in boiling isopropanol plus a minimum of methanol (followed by boiling to remove the methanol) gave a solution which on cooling to room temperature yielded 10.62 g. of the purified 1-[5-(1-methyl-2-imidazolin-2-yl)pentyl]-2,3-dimethylguanidine dihydroiodide, M.P. 183–184° C.

Example 13.—Preparation of 5-(2-imidazolin-2-yl)pentylamine intermediate

A mixture of 36.0 g. of O-methylcaprolactim and 25.0 g. of ethylene diamine was heated on the steam bath under a reflux condenser for 4 hours. The hot solution was diluted with 300 ml. of absolute ether and chilled to give hygroscopic crystals that were fused on the steam bath and stirred with 400 ml. of absolute ether. This caused the melt to crystallize while still warm. After one hour at room temperature, the product, 5-(2-imidazolin-2-yl) pentylamine, was collected by filtration, wt: 28.4 g., M.P. 69–82. A simple bulb-to-bulb distillation of the solid gave material with M.P. 77–80° C.

A sulfate salt of 5-(2-imidazolin-2-yl)pentylamine was prepared by addition of one molar-equivalent of the base to one molar-equivalent of cooled dilute sulfuric acid. The salt precipitated as an oil upon addition of ethanol to the aqueous solution. The oil crystallized on standing under ethanol to give material melting at 221–233° C. Purification was effected by two repetitions of dissolution in water and precipitation with ethanol to give the salt, M.P. 224.5–227.5° C.

The dihydroiodide salt of 5-(2-imidazolin-2-yl)pentylamine was prepared with one molar-equivalent of the base and two molar-equivalents of 47% hydroiodic acid in 90% aqueous ethanol. Most of the water was removed by boiling to allow azeotropic evaporation in the presence of added absolute ethanol or isopropanol. The desired salt, M.P. 159.5–160.5° C., precipitated from isopropanol solution at room temperature. Recrystallization from isopropanol-ether did not alter the melting point.

Example 14

By the procedure of Example 13, a series of (1,3-diazacycloalkene-2-yl)alkylamine intermediates were prepared. In general, these were distilled directly from the reaction solution without any attempt to crystallize them before distillation. The following is a summary of these syntheses:

| Product | Reagents | Boiling Points (° C./mm.) |
|---|---|---|
| 4-(2-imidazolin-2-yl)butylamine. | O-methylvalerolactim ethylene diamine. | 155/12 |
| 4-(3,4,5,6-tetrahydro-pyrimidin-2-yl)butylamine. | O-methylvalerolactim 1,3-diaminopropane. | 158/10 |
| 5-(3,4,5,6-tetrahydropyrimidin-2-yl)pentylamine. | O-methylcaprolactim 1,3-diaminopropane. | 160/4 |
| 5-(4,5,6,7-tetrahydro-3H-1,3-diazepin-2-yl)pentylamine. | O-methylcaprolactim 1,4-diaminobutane. | 162/6 |
| 6-(2-imidazolin-2-yl)hexylamine. | O-methylenantholactim ethylene diamine. | 175/10 |
| 6-(3,4,5,6-tetrahydropyrimidin-2-yl)hexylamine. | O-methylenantholactim 1,3-diaminopropane. | 188/10 |

Example 15

Preparation of 5-(1-methyl-2-imidazolin-2-yl)-pentylamine intermediate

A solution of 14.4 ml. (0.103 mole) of O-methylcaprolactim and 7.42 g. (0.100 mole) of N-methylethylene diamine in 25 ml. of ethanol was cooled and treated with 32 ml. of alcoholic hydrogen chloride solution (containing 0.2 eq. of HCl). The solution was stirred for a few minutes and then let stand at room temperature for 3 days. The solution was then poured into 1 liter of absolute ether to give the crude product, which was readily recrystallized from either isopropanol or ethanol to give 5-(1-methyl-2-imidazolin-2-yl)pentylamine dihydrochloride, M.P. 163–173° C. Further purification was effected by distillation of the free base, obtained by treatment of the above salt with aqueous potassium hydroxide and extraction with ether. The free base, B.P. 149° C./15 mm., $n_D^{22}$ 1.4955 was reconverted to the dihydrochloride salt, M.P. 168.5–173.5° C.

What is claimed is:

1. A member selected from the group consisting of a compound of the formula

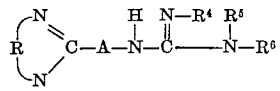

wherein: R is alkylene of 2 to 6 carbon atoms and separates its adjacent nitrogen atoms by 2 to 4 carbon atoms; A is alkylene of 2 to 6 carbon atoms and separates its adjacent nitrogen atom from the heterocyclic ring by at least 2 carbon atoms; and each of $R^1$, $R^4$, $R^5$ and $R^6$ is a member selected from the group consisting of hydrogen and alkyl having from 1 to about 4 carbon atoms; and non-toxic acid addition salts thereof.

2. A member selected from the group consisting of a compound of the formula

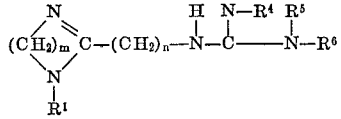

wherein: $m$ is an integer of 2 to 4; $n$ is an integer of 4 to 6; and each of $R^1$, $R^4$, $R^5$ and $R^6$ is a member selected from the group consisting of hydrogen and alkyl having from 1 to 2 carbon atoms; and non-toxic acid addition salts thereof.

3. A member of the group consisting of a compound of claim 2 wherein $m$ is 2; and non-toxic acid addition salts thereof.

4. A member of the group consisting of a compound of claim 3 wherein $n$ is 4; and each of $R^1$, $R^4$, $R^5$ and $R^6$ is hydrogen; and non-toxic acid addition salts thereof.

5. A member of the group consisting of a compound of claim 3 wherein $n$ is 5; an each of $R^1$, $R^4$, $R^5$ and $R^6$ is hydrogen; and non-toxic acid addition salts thereof.

6. A member of the group consisting of a compound of claim 3 wherein $n$ is 6; and each of $R^1$, $R^4$, $R^5$ and $R^6$ is hydrogen; and non-toxic acid addition salts thereof.

7. A member of the group consisting of a compound of claim 3 wherein $n$ is 5; each of $R^1$ and $R^6$ is hydrogen; and each of $R^5$ and $R^6$ is methyl; and non-toxic acid addition salts thereof.

8. A member of the group consisting of a compound of claim 3 wherein $n$ is 5; each of $R^1$, $R^4$ and $R^6$ is hydrogen; and $R^5$ is methyl; and non-toxic acid addition salts thereof.

9. A member of the group consisting of a compound of claim 3 wherein $n$ is 5; each of $R^1$ and $R^4$ is hydrogen; and each of $R^5$ and $R^6$ is methyl; and non-toxic acid addition salts thereof.

10. A member of the group consisting of a compound of claim 3 wherein $n$ is 5; $R^5$ is hydrogen; and each of $R^1$, $R^4$ and $R^6$ is methyl.

11. A member selected from the group consisting of a compound of the formula

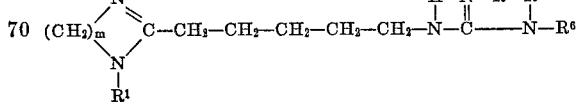

wherein: $m$ is an integer of 2 to 4; and each of $R^1$, $R^4$, $R^5$ and $R^6$ is a member consisting of hydrogen and alkyl of 1 to 2 carbon atoms; and non-toxic acid addition salts thereof.

12. A non-toxic acid addition salt of claim 11 wherein $m$ is 2.

13. A member selected from the group consisting of a compound of the formula

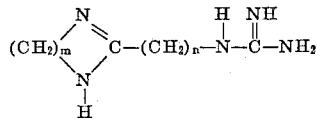

wherein: $n$ is an integer of 4 to 6; and $m$ is an integer from 2 to 4; and non-toxic acid addition salts thereof.

14. 5-(2-imidazolin-2-yl)-pentylguanidine sulfate.

15. 6-(3,4,5,6-tetrahydropyrimidin-2-yl)hexylguanidine sulfate.

References Cited

UNITED STATES PATENTS

| 2,754,183 | 7/1956 | Chenicek et al. | 260—256.4 |
| 3,093,654 | 6/1963 | Scanley et al. | 260—309.6 |
| 3,189,599 | 6/1965 | Mull | 260—239 |

FOREIGN PATENTS

| 1,291,535 | 3/1962 | France. |

OTHER REFERENCES

Takagi et al.: Chem. Pharm. Bull., vol. 12 (May 5, 1964), pp. 607–14.

NICHOLAS S. RIZZO, *Primary Examiner.*

R. J. GALLAGHER, *Assistant Examiner.*

UNITED STATES PATENT OFFICE
CERTIFICATE OF CORRECTION

Patent No. 3,399,197　　　　　　　　　　　　　　　August 27, 1968

Edward M. Roberts

It is certified that error appears in the above identified patent and that said Letters Patent are hereby corrected as shown below:

Column 8, line 22, "penyl" should read -- pentyl --; Column 8, lines 36 to 41, the right-hand portion of the formula reading "$-C_3$" should read -- $-CH_3$ --. Column 10, lines 15 to 18, the left-hand portion of the formula should appear as shown below:

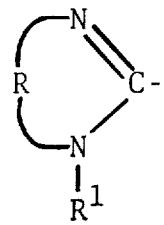

same column 10, lines 29 to 34, the formula should appear as shown below:

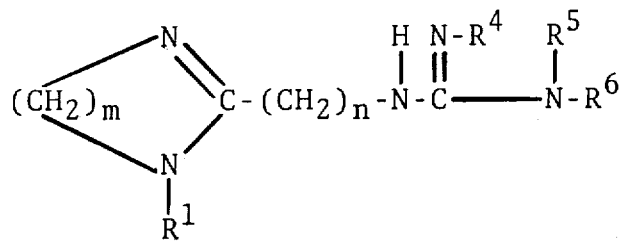

same column 10, line 53, "$R^5$ and $R^6$" should read -- $R^4$ and $R^5$ --.

Signed and sealed this 3rd day of February 1970.

(SEAL)
Attest:

EDWARD M. FLETCHER, JR.　　　　　　　　　　WILLIAM E. SCHUYLER, JR.
Attesting Officer　　　　　　　　　　　　　　Commissioner of Patents